United States Patent
Hummel

(10) Patent No.: US 7,108,463 B2
(45) Date of Patent: Sep. 19, 2006

(54) LIFT MECHANISM FOR ROUTERS

(76) Inventor: Richard M. Hummel, 8318 Manorford Dr., Parma, OH (US) 44129

( * ) Notice: Subject to any disclaimer, the term of this patent is extended or adjusted under 35 U.S.C. 154(b) by 417 days.

(21) Appl. No.: 10/459,656

(22) Filed: Jun. 12, 2003

(65) Prior Publication Data

US 2004/0253069 A1   Dec. 16, 2004

(51) Int. Cl.
*B23C 5/00* (2006.01)
*B23C 1/20* (2006.01)

(52) U.S. Cl. ............... 409/182; 409/206; 409/210; 409/229; 144/135.2; 144/136.95; 144/286.5

(58) Field of Classification Search ........ 409/175–182, 409/228, 229, 210, 214, 218, 206; 144/135.2, 144/136.95, 286.5, 154.5
See application file for complete search history.

(56) References Cited

U.S. PATENT DOCUMENTS

| | | | |
|---|---|---|---|
| 2,799,305 | A | 7/1957 | Groehn |
| 3,710,833 | A | 1/1973 | Hammer et al. |
| 3,901,295 | A | 8/1975 | Downing |
| 4,281,694 | A * | 8/1981 | Gorman ............... 144/154.5 |
| 4,454,898 | A | 6/1984 | Pavnica |
| 4,456,042 | A | 6/1984 | Clark et al. |
| 4,484,608 | A | 11/1984 | Ferdinand et al. |
| 4,537,234 | A | 8/1985 | Onsrud |
| 4,679,606 | A | 7/1987 | Bassett |
| 4,718,468 | A * | 1/1988 | Cowman ............... 144/154.5 |
| 4,738,571 | A | 4/1988 | Olson et al. |
| 4,763,706 | A * | 8/1988 | Rice et al. ............ 144/136.1 |
| 5,016,358 | A * | 5/1991 | Rice et al. .............. 33/569 |
| 5,139,061 | A | 8/1992 | Neilson |
| 5,725,036 | A * | 3/1998 | Walter ................ 144/135.2 |
| 5,772,368 | A | 6/1998 | Posh |
| 6,318,936 | B1 * | 11/2001 | McFarlin et al. ......... 409/131 |
| 6,374,878 | B1 | 4/2002 | Mastley et al. |
| 6,382,276 | B1 * | 5/2002 | Daniels et al. ........... 144/135.2 |
| 6,505,659 | B1 | 1/2003 | Hummel |
| 6,520,224 | B1 * | 2/2003 | Smith .................. 144/135.2 |
| 6,550,154 | B1 | 4/2003 | Smith |
| 6,739,066 | B1 * | 5/2004 | Smith .................... 33/638 |
| 6,792,984 | B1 * | 9/2004 | Fontaine ............... 144/135.2 |
| 6,948,892 | B1 * | 9/2005 | Hummel ................ 409/182 |
| 2001/0055519 | A1 * | 12/2001 | Souders ................ 409/182 |
| 2002/0020466 | A1 * | 2/2002 | Mc Farlin et al. ....... 144/135.2 |
| 2002/0043296 | A1 * | 4/2002 | Daniels et al. ........... 144/286.5 |

FOREIGN PATENT DOCUMENTS

CA       2314653  A1 *  1/2001

* cited by examiner

*Primary Examiner*—Monica Carter
*Assistant Examiner*—Michael W. Talbot
(74) *Attorney, Agent, or Firm*—Sand & Sebolt

(57) ABSTRACT

A support mechanism for selectively mounting a fixed base or plunge type router on a router table comprises a table plate having top and bottom sides and an opening therethrough having an opening axis, and a carriage beneath the table plate for supporting a router coaxial with the opening axis. Guide posts slidably support the carriage for axial displacement toward and away from the table plate, and adjusting screws rotatable relative to the table plate interengage with the carriage for rotation of the screws to displace the carriage relative to the table plate. The carriage includes a pair of carriage blocks interengaging with the guide posts and adjusting screws, and a router mounting plate which is removably mounted on the carriage blocks. The router mounting plate is provided with a plurality of sets of mounting holes, and each set is for mounting a different model router on the table plate.

42 Claims, 8 Drawing Sheets

LIFT MECHANISM FOR ROUTERS

BACKGROUND OF THE INVENTION

This invention relates to the art of routers and, more particularly, to an improved lift mechanism for supporting a router beneath a work supporting surface for adjustment of the position of the router bit or cutter relative to the work supporting surface.

The present invention finds particular utility in connection with the support of a fixed base or plunge router relative to a work supporting surface and, accordingly, will be illustrated and described in detail herein in connection with such routers. At the same time, however, it will be appreciated that the invention is applicable to the support of other tools of the character wherein a driven bit, cutter, blade, or the like is supported for vertical adjustment relative to a work supporting surface such as a work bench or table.

It is known, as shown for example in my U.S. Pat. No. 6,505,659 and in my copending patent application Ser. No. 10/159,356 filed May 30, 2002, both of which are hereby incorporated herein by reference, to support a fixed base or plunge router beneath a work supporting surface such that the router and thus a router bit to be driven thereby is vertically adjustable relative to the work supporting surface. The adjustability provides for accommodating a wide variety of router bit profiles and, as is well known, such routers are used by wood workers in connection with the production of furniture, decorative moldings, picture framing strips, and in conjunction with the joining of wood pieces, the forming of dovetail joints, box joints and the like. High quality work in connection with the use of routers for the latter and other purposes requires not only a good router, sharp bits, good wood, and a skilled operator, but also, precision with respect to obtaining and maintaining a truly perpendicular orientation of the router axis and thus the router bit axis with the plane of the work supporting surface. Further, high quality work requires stability against vibration during a cutting operation, and the ability to accurately and minutely control adjustment of the vertical position of the router bit relative to the work supporting surface.

While the lift mechanisms disclosed in my aforementioned patent and patent application promote the ability to obtain the foregoing desired attributes, the lift mechanisms are structurally distinct and designed to accommodate the mounting and adjustability of just one or the other of the fixed base and plunge type routers. Accordingly, a craftsman, a wood working shop, or the like, must purchase and maintain two lift mechanisms in order to be able to selectively use a fixed base or a plunge router. If the craftsman or shop has only one or the other of the lift mechanisms, then it is obvious that the shop or craftsman is limited to the use of the corresponding one of the two types of routers. In either case, there is a potential for either undesirably high purchase and maintenance costs if two router lifts are desired, or the loss of the versatility afforded by the selective use of the two different types of routers and the ability to selectively take advantage of the unique characteristics of each.

SUMMARY OF THE INVENTION

In accordance with the present invention, an improved router lift mechanism is provided for adjusting the router bit height of either a fixed base or a plunge router relative to the working surface of a router table or the like beneath which the router is mounted. Moreover, the lift mechanism according to the invention is not only capable of selective use with either a fixed base or a plunge router but also provides for the mounting of any one of a variety of different makes or models of both fixed base and plunge routers without having to make any structural modification of the lift mechanism in order to do so. Still further, these capabilities are obtained while retaining the ability to obtain and maintain a truly perpendicular orientation of the router axis with the plane of the work supporting surface, stability against vibration during a cutting operation, and the ability to accurately and minutely control adjustment of the vertical position of the router bit relative to the work supporting surface.

More particularly in accordance with the invention, the lift mechanism includes a carriage mounted beneath a work table, table plate or the like for adjustment toward and away from the work supporting surface defined by the top side of the table, and the ability to selectively mount any one of a variety of different makes or models of either a fixed base or plunge router is achieved by providing the carriage with a router mounting plate by which any one of the selectable routers can be attached to the carriage for displacement therewith. Preferably, the router mounting plate is a separable component of the carriage and is provided with a plurality of sets of openings therethrough, each of which sets is dimensioned and oriented for alignment with openings in the base of a given make and/or model router. Accordingly, all that is necessary to mount a given router on the lift mechanism is to attach the mounting plate to the base of the router and then reattach the mounting plate to the lift mechanism.

In accordance with another aspect of the invention, the carriage is adapted to be elevated and lowered relative to the table plate through a lift screw arrangement between the table plate and carriage and wherein the lift screws are rotated in unison through the use of a belt and sprocket arrangement, and a brake mechanism is incorporated in one of the sprocket wheels of the drive train for precluding rotation of the lift screws during a routing operation and for releasing the lift screws for rotation to facilitate adjusting the height of a router blade relative to the work surface.

In accordance with a further aspect of the invention, the underside of the table plate is recessed axially upwardly to accommodate movement of the router mounting plate into the recess to increase the travel capability of the carriage and thus the router bit upwardly from the work supporting surface. Moreover, the recess facilitates aligning the mounting plate with mounting blocks of the carriage in connection with reattaching the mounting plate after a router is attached thereto.

It is accordingly an outstanding object of the present invention to provide an improved router lift mechanism for selectively mounting either a fixed base or a plunge router beneath a work table for vertical adjustment relative thereto.

Another object is the provision of a router lift mechanism of the foregoing character which enables the selective mounting of a variety of makes and/or models of either fixed base or plunge routers.

Yet another object is the provision of a router lift mechanism of the foregoing character which provides for increased travel of the carriage toward the work supporting surface relative to lift mechanisms heretofore available.

Still a further object is the provision of a lift mechanism of the foregoing character in which the carriage is displaceable through a lift screw, sprocket wheel and chain drive arrangement and wherein the drive arrangement is adapted to be selectively braked to preclude rotation of the lift screws during use of the router.

Yet another object is the provision of a lift mechanism of the foregoing character having increased versatility relative to lift mechanisms heretofore available.

DESCRIPTION OF THE DRAWINGS

The foregoing objects, and others, will in part be obvious and in part pointed out more fully hereinafter in conjunction with the description of a preferred embodiment of the invention illustrated in the accompanying drawings in which.

DESCRIPTION OF A PREFERRED EMBODIMENT

Figure 1:
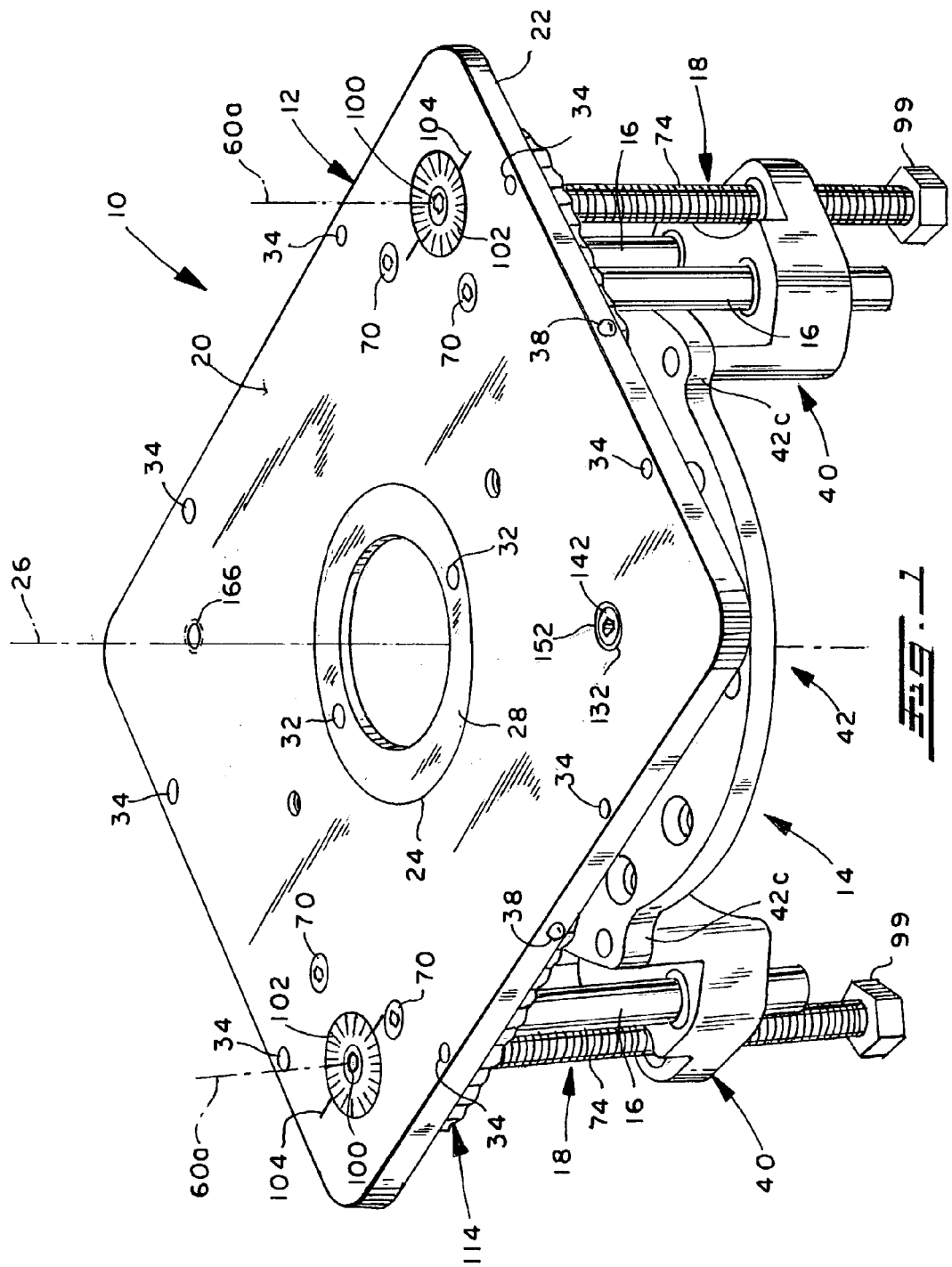
FIG. 1 is a perspective view of a router support mechanism in accordance with the present invention.

Referring now in greater detail to the drawings, wherein the showings are for the purpose of illustrating a preferred embodiment of the invention only, and not for the purpose of limiting the invention, a router support mechanism 10 in accordance with the invention is shown as comprising a table plate 12 and a carriage 14 mounted in suspension beneath plate 12, as set forth more fully hereinafter, by a pair of support and lift clusters each of which comprises a pair of support and guide posts 16 and a corresponding lift screw unit 18. Table plate 12 is adapted to be inserted into an opening provided therefor in the top of a router table, but it will be appreciated that the support mechanism according to the invention could be incorporated as an integral part of a router table with the component parts of the support mechanism suspended beneath the table as opposed to an insertable table plate. Preferably, plate 12 is of cast aluminum and has top and bottom sides 20 and 22, respectively, and an opening 24 therethrough having an axis 26. Opening 24 is adapted to receive anyone of a plurality of removable ring members 28 having twist-lock components about the outer periphery thereof for interengagement with twist-lock components 30 spaced apart about the periphery of opening 24. Each of the rings 28 has a different size opening therethrough coaxial with axis 26 for accommodating a particular router bit, and the rings are provided with diametrically opposed openings 32 therethrough for accommodating a spanner wrench by which the ring is mounted and removed from the table plate.

The peripheral edge of plate 12 is provided with a plurality of openings 34 therethrough for receiving threaded fasteners by which the plate is leveled relative to a table top and, preferably, any two adjacent sides of plate 12 are provided with spring biased ball detent inserts 36 which include a spring biased ball member 38 projecting outwardly of the side of the plate for engagement in the opening in the router table to stabilize the table plate against side play.

As best seen in FIGS. 1–3, 5 and 6, carriage 14 comprises a pair of carriage blocks 40 on diametrically opposite sides of opening 24 and a router mounting plate 42 having top and bottom sides 42a and 42b, respectively, and diametrically opposite mounting ends 42c. Each of the carriage blocks 40 has vertically stepped radially outer, intermediate and radially inner portions 44, 46 and 48, respectively, and plate 42 is adapted to be removably secured to the upper end of radially inner portion 48 of the corresponding carriage block by a plurality of machine screws 50 extending upwardly through corresponding openings therefor in the radially inner portion of the corresponding carriage block and into threaded openings 52 provided therefor in router mounting plate 42. Mounting plate 42 has an opening 54 therethrough having an axis 56 which is coaxial with axis 26 when the carriage is mounted on table 12 and, for the purpose set forth more fully hereinafter, mounting plate 42 is provided with a plurality of sets of router mounting openings therethrough, designated a-i, and each of which sets is for mounting a particular router model on the carriage and table plate. In this respect, for example, set a is shown with the designation DW625 which is the mounting hole set for a DeWalt 625 router.

Figure 2:
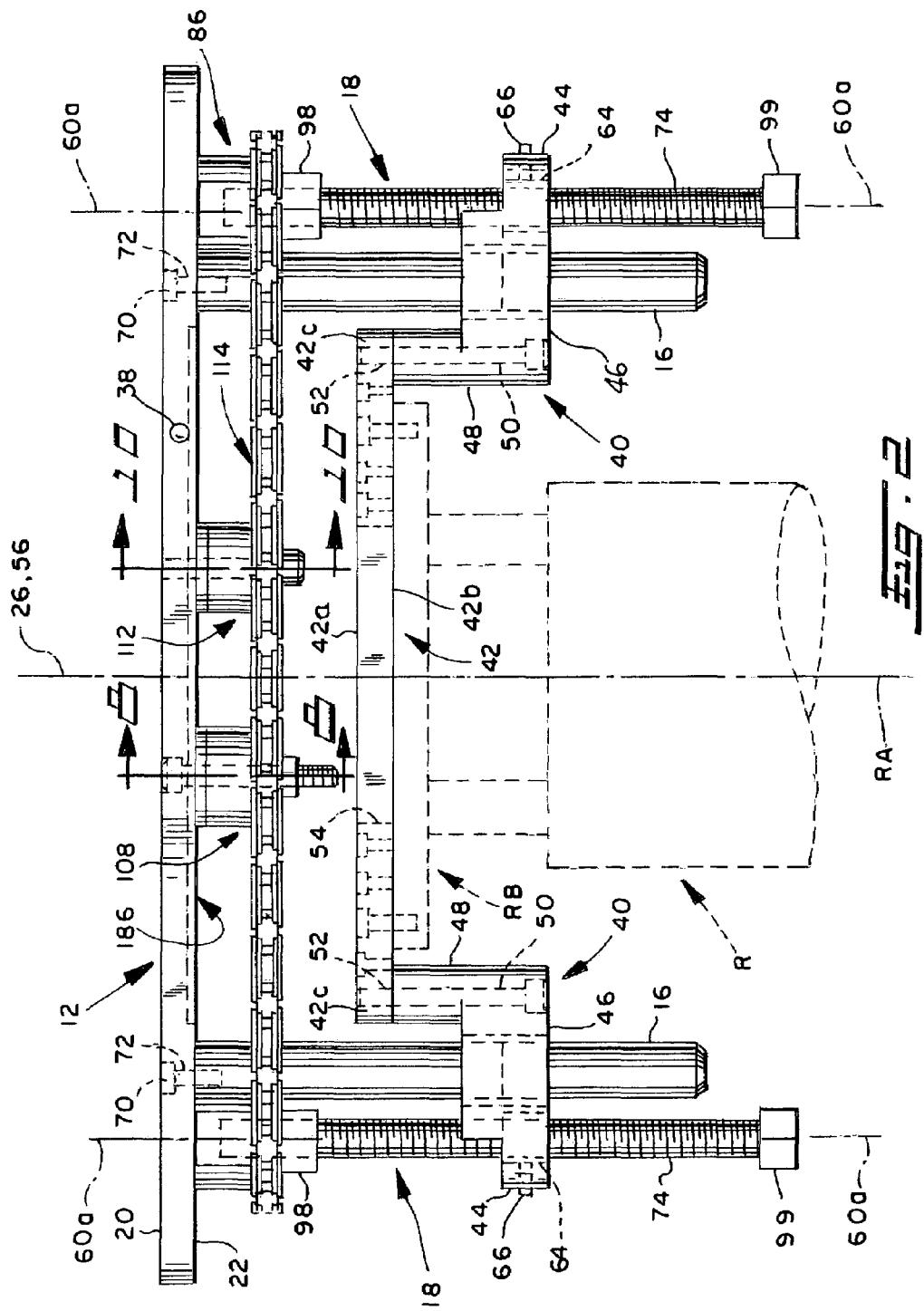
FIG. 2 is a front elevation view of the support mechanism shown in FIG. 1.
Figure 3:
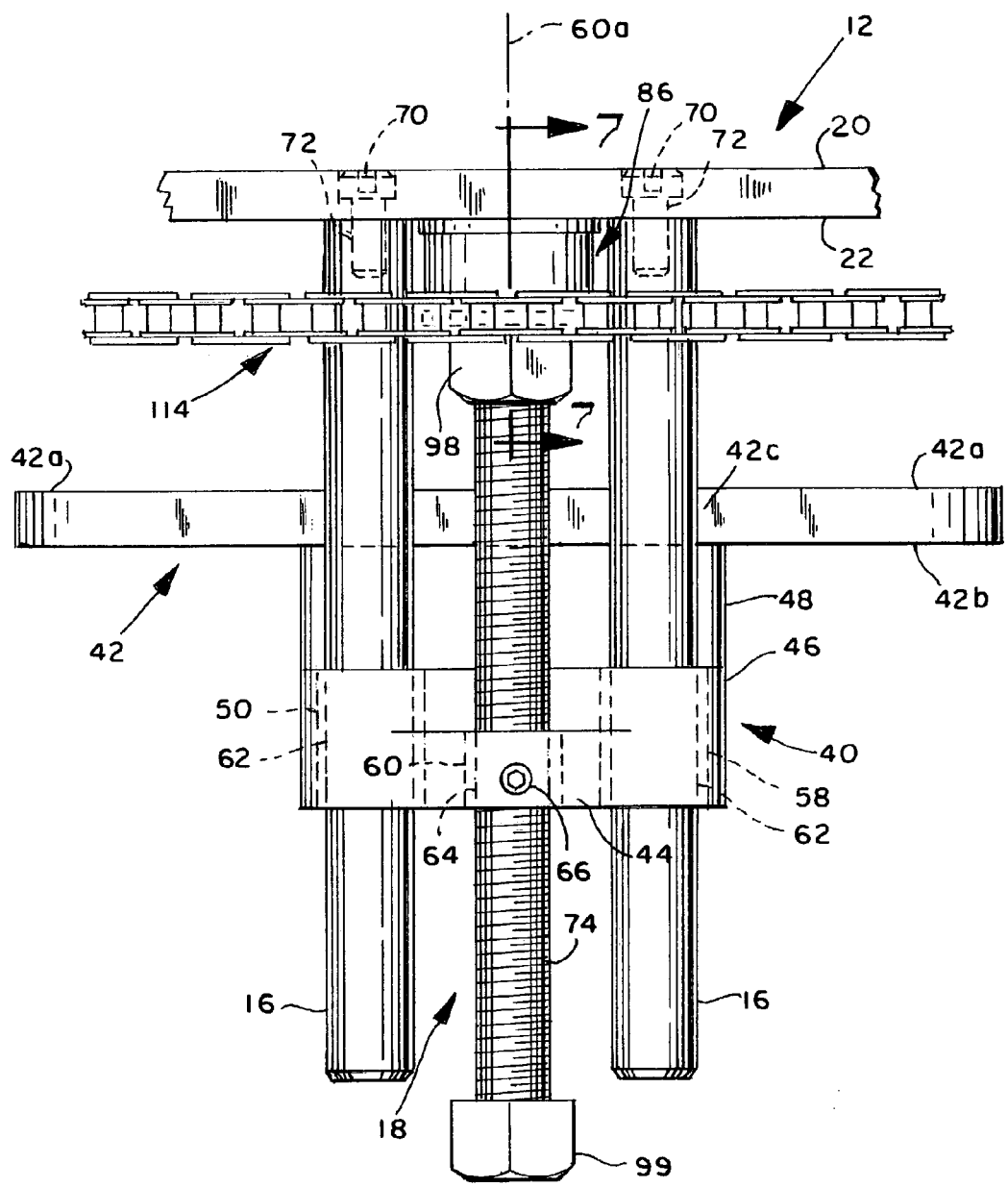
FIG. 3 is a side elevation view of the support mechanism shown in FIG. 1.

Each of the intermediate portions 46 of the carriage blocks 40 is provided with a pair of circular openings 58 which receive the corresponding support and guide posts 16 as set forth hereinafter, and circular openings 60 are provided in radially outer portion 44 of each carriage block for receiving the lift screw of the corresponding lift screw unit 18 as set forth more filly hereinafter. Openings 60 are on diametrically opposite sides of mounting plate axis 56 when mounting plate 42 is attached to the carriage blocks and, therefore, are on diametrically opposite sides of axis 26 of table plate opening 24 when the carriage is mounted on the table plate. Accordingly, it will be appreciated that the axes of openings 60 and opening 54 of the router mounting plate are coplanar when the mounting plate is attached to the carriage blocks, and that openings 58 in each of the carriage blocks are on laterally opposite sides of the plane through the axes of openings 54 and 60. When the carriage is mounted on table plate 12, the axes of openings 54 and 60 are coplanar with axis 26 of table plate opening 24, and the axes of openings 58 of the two carriage blocks which are on laterally opposite sides of the latter plane are coplanar with axis 26 of opening 24 in the table plate. As best seen in FIGS. 2 and 3, carriage blocks 40 are provided with oil impregnated bronze bearing sleeves 62 which are press fit or otherwise secured in openings 58 to slidably receive the corresponding support and guide post 16. Further, each carriage block is provided with a cast bronze bearing sleeve 64 which is internally threaded for threaded interengagement with the lift screw of the corresponding lift screw unit 18. Bearing sleeves 64 are received in the corresponding opening 60 in the carriage block and retained in the latter against rotation relative to the carriage block by a roll pin 66 or the like.

As will be appreciated from FIGS. 1–4 of the drawing, each of the support and guide posts 16 which preferably are of steel, is secured to bottom side 22 of table plate 12 by means of corresponding socket head cap screws 70 extending through openings therefor in plate 12, not designated numerically, and into threaded engagement with threaded bores 72 provided therefor in the upper ends of the posts. As will be appreciated from FIGS. 1–4 and 7, each of the lift screw units 18 is mounted on table plate 12 for rotation relative thereto about a corresponding screw axis 60*a*. More particularly in this respect, each of the lift screw units 18 includes a threaded lift screw member 74, preferably of 12L14 steel, having its upper end threadedly received in a cap member 76. Cap member 76 is T-shaped in cross-section and includes a radially outwardly extending circumferential flange 78 at its upper end rotatably supported in a circular recess 80 provided therefor in top side 20 of plate 12. Recess 80 includes a central opening 82 through plate 12 which rotatably receives the shank portion 77 of cap member 76 and, preferably, a thrust bearing plate 84 is interposed between flange 78 and the bottom of recess 80. The lift screw unit is axially captured relative to plate 12 by means of a sprocket wheel 86 preferably of aluminum, having a hub portion 88 surrounding shank 77 of cap member 76 and a radially outwardly extending peripheral flange 90 at the lower end thereof having sprocket teeth 92 about the periphery thereof. Preferably, a thrust washer 84 is also interposed between the upper end of hub portion 88 and bottom side 22 of plate 12, and cap member 76 and sprocket wheel 86 are interengaged with screw member 74 for rotation therewith such as by a roll pin 94. A washer 96 and a stop nut 98 engage against the lower ends of the cap member and sprocket wheel, and a stop nut 99 is mounted on the lower end of screw member 74 against rotation relative thereto for the purpose set forth hereinafter. The upper end of cap member 76 is provided with an axially inwardly extending hexagonal passageway 100 by which the corresponding lift screw 74 is adapted to be rotated through the use of an appropriate tool such as a crank. Alternatively, or optionally, a flexible drive cable, similar to that shown in my U.S. Pat. No. 6,505,659, can be provided with a nut engaging member for rotating one of the stop nuts 99 on the lower ends of screw members 74 for rotating the latter to adjust the carriage position.

Figure 7:
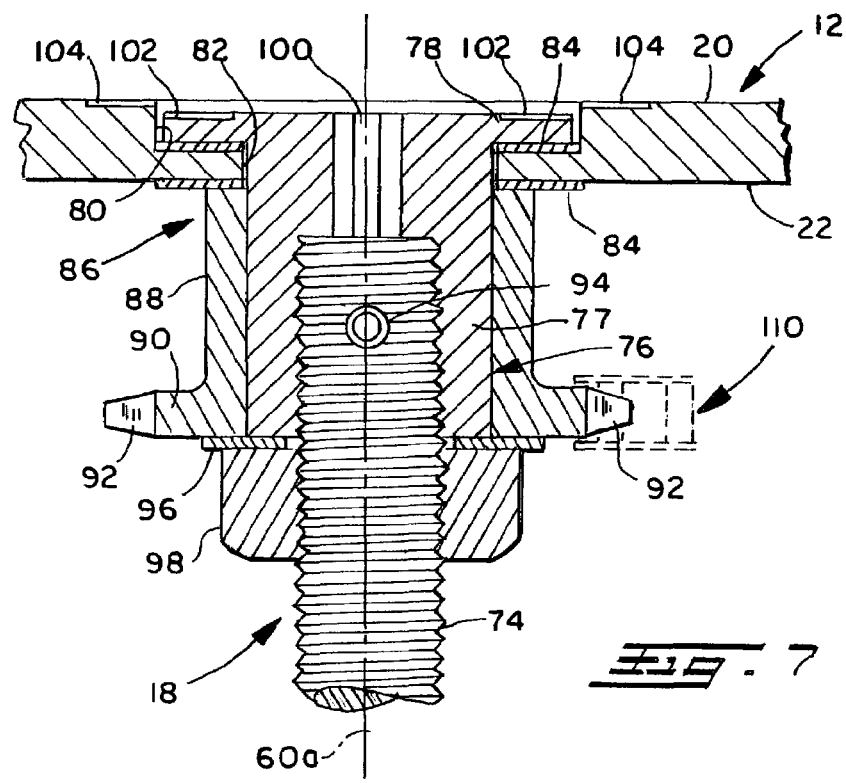
FIG. 7 is an enlarged sectional elevation view of a lift screw component of the mechanism, taken along line 7—7 in FIG. 3.

As best seen in FIGS. 1 and 7, the upper end of each of the lift screw units as defined by flange 78 is exposed at top side 20 of table plate 12 and is provided on the upper side thereof with indicia 102 formed by stamping the upper surface of the flange, for example. The indicia extends about the outer periphery of flange 78 and is in the form of graduation marks representing an incremental degree of rotation of the lift screw, and the top side of plate 12 is provided on diametrically opposite sides of recess 80 with fixed reference marks 104 relative to which the incremental markings on the scale plate are displaceable. Screw member 74 can, for example, have a ½-32 thread, whereby one revolution of the screw displaces the carriage and thus a router bit of a router mounted thereon 1/32 inch relative to top side 20 of table plate 12. The graduation marks on flange 78 preferably represent approximately 0.001 inch of displacement, whereby extremely small and precise adjustments of a router bit relative to top surface 20 are possible.

Figure 4:
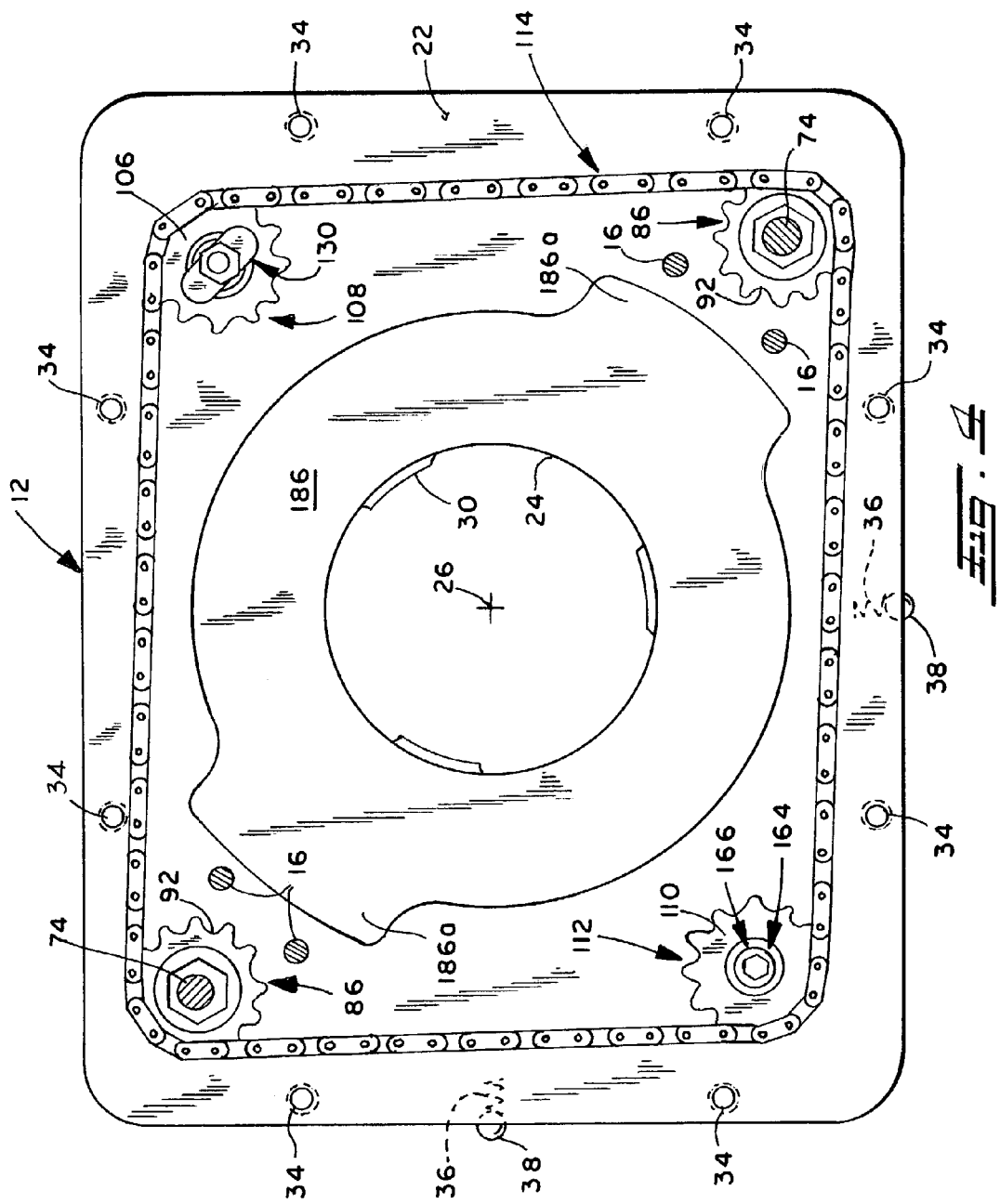
FIG. 4 is a plan view of the bottom side of the support mechanism with the carriage removed and showing the drive train for the lift screws.
Figure 5:
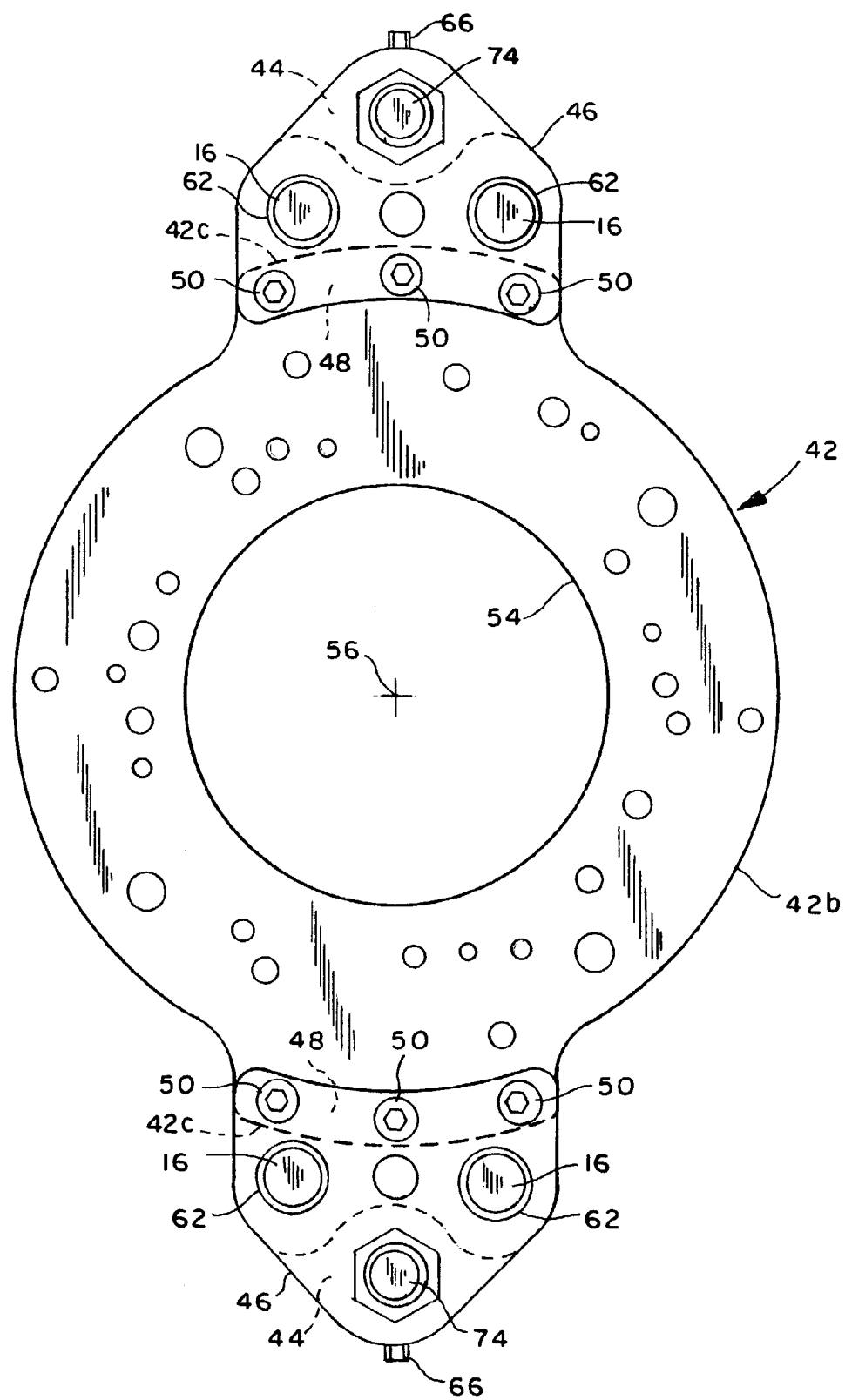
FIG. 5 is a plan view of the bottom side of the router mounting plate.
Figure 6:
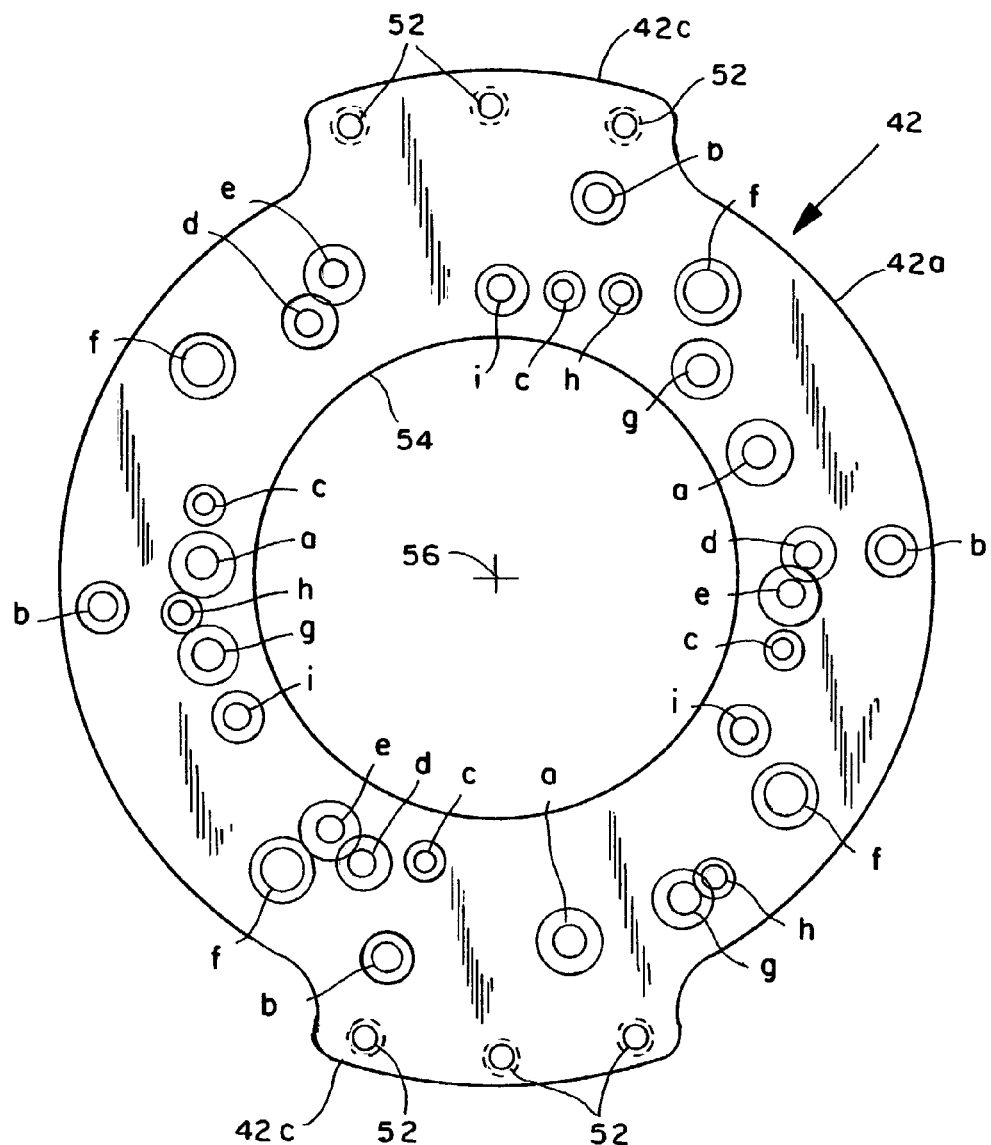
FIG. 6 is a plan view of the top side of the router mounting plate.
Figure 8:
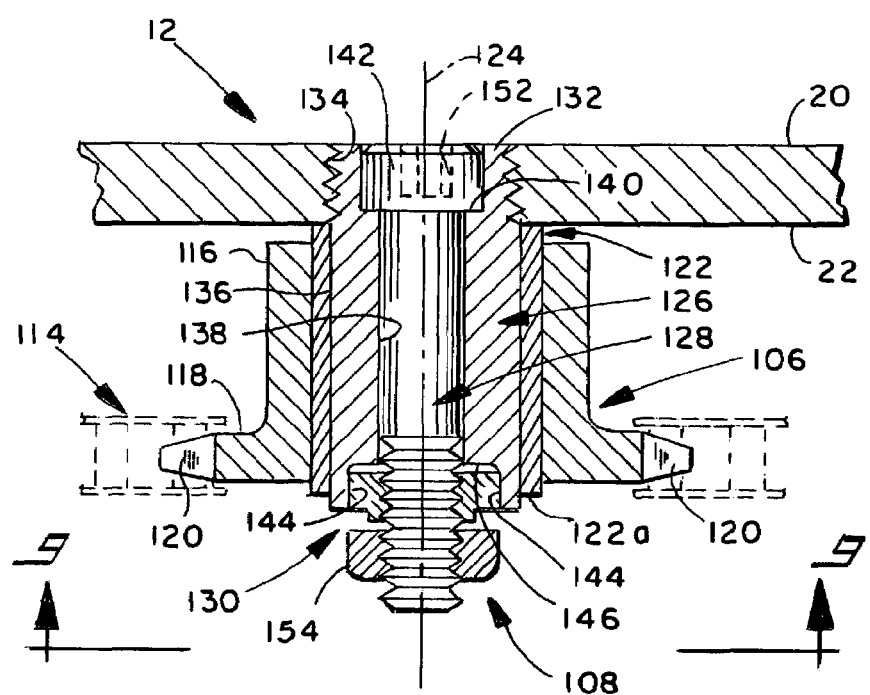
FIG. 8 is an enlarged sectional elevation view of an idler sprocket wheel of the drive train and a brake mechanism associated therewith, taken along line 8—8 in FIG. 2.
Figure 9:
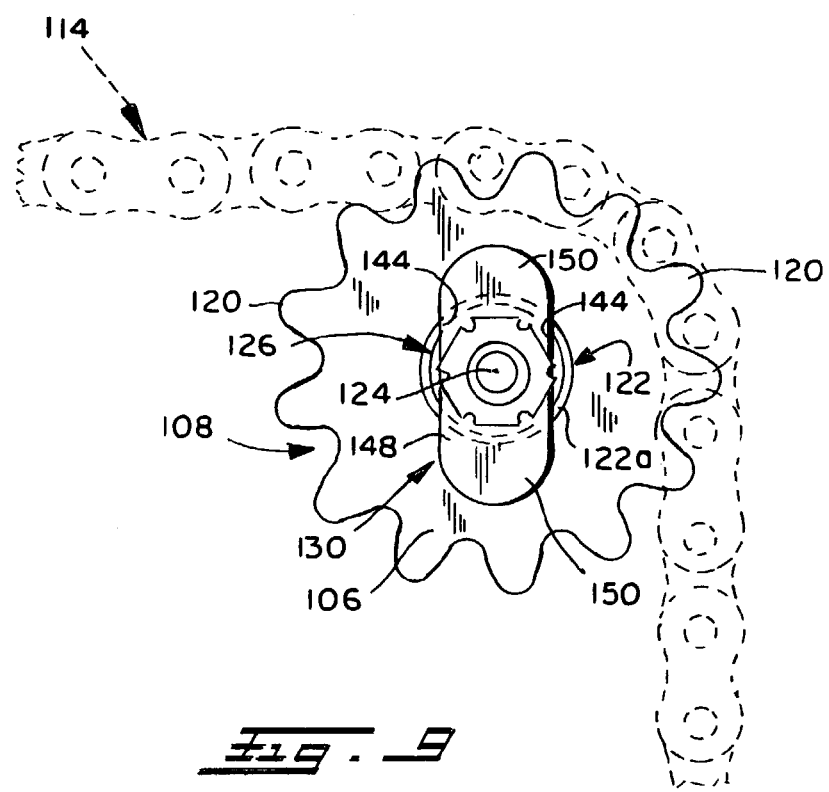
FIG. 9 is a bottom view of the idler sprocket wheel, looking in the direction of line 9—9 in FIG. 8; and, FIG. 10 is an enlarged sectional elevation view of an idler sprocket wheel of the drive train and a chain tensioning component associated therewith, taken along line 10—10 in FIG. 2.

As will be appreciated from FIG. 4 of the drawing, lift screws 74 are adapted to be simultaneously rotated relative to table plate 12 for adjusting the position of carriage 14 relative thereto by a drive train which includes the sprocket wheel 86 on each of the lift screw members, sprocket wheel 106 of an idler sprocket wheel unit 108, sprocket wheel 110 of an idler sprocket wheel unit 112, and an endless sprocket chain 114 which is trained about sprocket wheels 86, 106 and 110 and which, preferably, is a steel roller chain. Sprocket wheel units 108 and 112 are on diametrically opposite sides of opening 24 and are circumferentially between lift screw units 18. Idler sprocket wheel unit 108 includes a brake assembly for selectively precluding rotation of the feed screws, and idler sprocket wheel unit 112 includes an arrangement for adjusting the tension on chain 114. More particularly in this respect, as best seen in FIGS. 8 and 9 of the drawing, sprocket wheel 106 of idler sprocket wheel unit 108 includes a hub portion 116 having a radially outwardly extending peripheral flange 118 on one end thereof and the outer periphery of which is provided with sprocket teeth 120 for engagement with sprocket chain 114. The sprocket wheel includes a powder metal bearing sleeve 122 which is interengaged therewith by a press fit, and the sprocket wheel is mounted on table plate 12 for rotation about a sprocket wheel axis 124 by means of a brake assembly including a brake stem component 126, a socket head cap screw 128, and a brake pad 130. More particularly in this respect, brake stem component 126 has an externally threaded upper end 132 received in an internally threaded bore 134 in the table plate and a cylindrical outer surface 136 which extends downwardly from bottom side 22 of table plate 12 and rotatably receives bearing sleeve 122 of the sprocket wheel. The interengagement between threaded end 132 of the brake stem and threaded bore 134 provides for the brake stem to be interengaged with table plate 12 against rotation relative thereto. Brake stem 126 has a bore 138 therethrough coaxial with axis 124 for rotatably receiving brake actuating cap screw 128, and the upper end of bore 138 is radially enlarged to provide a shoulder 140 which is engaged by head 142 of cap screw 128 to axially position the latter in bore 138. The lower end of brake stem 126 is provided with a recess extending axially inwardly of the lower end and transverse to axis 124 and which recess includes laterally spaced apart parallel sides 144 and a planar bottom wall 146 therebetween. Bottom wall 146 is axially inwardly adjacent lower end 122*a* of bearing sleeve 122, and brake pad 130 has a central portion 148 received in the recess and opposite ends 150 which extend across diametrically opposite portions of lower end 122*a* of the bearing sleeve. Sides 144 of the recess restrain rotation of the brake pad relative to brake stem 126, and the lower end of cap screw 128 is threadedly interengaged with central portion 148 of the brake pad, whereby rotation of cap screw 128 relative to brake stem 126 axially displaces brake pad 130 relative to the brake stem and, thus, lower end 122*a* of bearing sleeve 122. Head 142 of the cap screw has a hexagonal recess 152 for rotating the screw and, preferably, the lowermost end of the cap screw is provided with a stop nut 154 which is rotatable therewith to limit displacement of brake pad 130 in the direction away from lower end 122*a* of the bearing sleeve. Cap screw 128 is adapted to be rotated through the use of an Allen wrench or hex head screwdriver type tool, for example, and rotation of the cap screw in opposite directions relative to the brake stem displaces the brake pad axially toward and away from bearing end 122*a* to respectively engage and disengage the latter. Engagement of the brake pad with bearing end 122*a* presses the upper end of the bearing against bottom side 22 of table plate 12 to restrain or preclude rotation sprocket wheel 106 about axis 124, and displacement of the brake pad away from bearing end 122*a* releases the latter for rotation relative to brake stem 126. It will be appreciated, of course, that braking of the sprocket wheel 106 precludes rotation of the feed screws.

Such braking is preferably employed during a routing operation to preclude rotation of the lift screws which might be caused by vibration.

Figure 10:
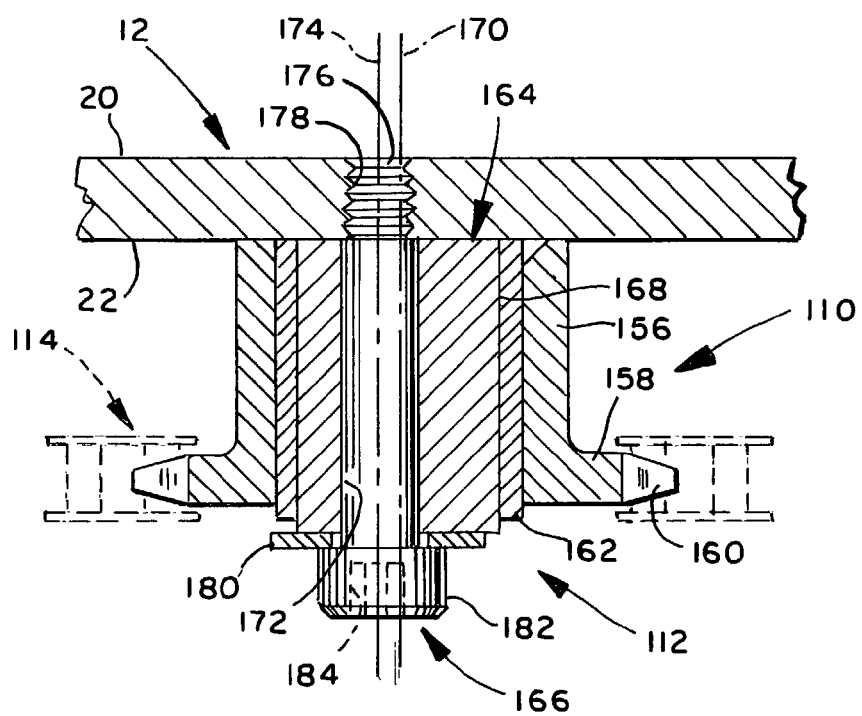

As best seen in FIG. 10, sprocket wheel 110 of idler sprocket wheel unit 112 includes a hub portion 156 having a radially outwardly extending peripheral flange 158 at the lower end thereof and the outer periphery of which is provided with sprocket teeth 160 for engagement with sprocket chain 114. A powder metal bearing sleeve 162 is interengaged with sprocket wheel 110 by a press fit therebetween, and the sprocket wheel is rotatably mounted on table plate 12 by means of a cam 164 and socket head cap screw 166. More particularly in this respect, cam 164 has a cylindrical outer surface 168 rotatably receiving bearing sleeve 162, whereby sprocket wheel 110 is rotatable about axis 170 of surface 168. Cam 164 has a bore 172 therethrough having an axis 174 which is laterally offset and parallel to axis 170, and the cam end sprocket wheel components are mounted on the underside of table plate 12 by interengaging the externally threaded upper end 176 of cap screw 166 with an internally threaded bore 178 provided therefor in table plate 12. Preferably, a stainless steel washer 180 is interposed between the lower end of cam 164 and head 182 of cap screw 166. Head 182 is provided with a hexagonal tool recess 184 for receiving a tool by which the cap screw can be rotated, and rotation of the cap screw in the direction to displace head 182 toward table plate 12 clamps cam 164 against the underside of the table to preclude rotation of the cam relative to the table. By rotating the cap screw in the opposite direction, cam 164 is released for rotation about axis 174, whereby the cam can be displaced relative to axis 174 to selectively increase or decrease the tension on chain 114, after which the cap screw is again displaced to clamp the cam against bottom side 22 of mounting plate 12.

Referring to FIGS. 1, 2 and 4–6, the mounting of a router R on table plate 12 is achieved as follows. Table plate 12 with carriage 14 thereon is turned upside down for top side 20 to rest on an underlying support surface. Carriage mounting plate 42 is then removed from carriage blocks 40 by removing the six socket head cap screws 50 which connect the mounting plate to the upper ends of inner portions 48 of the two carriage blocks. Carriage mounting plate 42 is then attached to the base RB of the router, with bottom side 42b facing the router base, using the appropriate set of holes a-i for the router being mounted and using machine screws or socket head cap screws which extend through the appropriate holes and into threaded engagement with the router base. When so attached, the router axis RA is coaxial with axis 56 of the mounting plate. As will be appreciated from FIGS. 2, 5 and 6, the upper ends of the mounting holes on top side 42a of the mounting plate are counter bored so that the heads of the fasteners are below the plane of top side 42a of the mounting plate. The mounting plate with the router thereon is then placed against bottom side 22 of table plate 12 which, as shown in FIGS. 2 and 4 is preferably provided with a recess 186 having a peripheral contour corresponding to that of router mounting plate 42, including ends 186a corresponding to mounting ends 42c of the router mounting plate. Recess 186 advantageously provides for aligning mounting plate 42 with carriage blocks 40 during the assembly operation and, further, lengthens the path of travel of the carriage and thus the router thereon in the direction toward top side 20 of table plate 12 than would be possible if bottom side 22 of the table plate were to limit the carriage travel. Remounting of the router mounting plate is then completed by rotating feed screws 74 through the use of the stop nut 99 on one of the screws to lower the carriage blocks 40 until radially inner portions 48 thereof engage against the mounting ends 42c of the router mounting plate. The six socket head cap screws 50 are then installed to secure router mounting plate 42 to carriage blocks 40. The table plate and router are then adapted to be mounted on a router table by inserting the table plate in the opening therefor in the router table.

As will be appreciated from the foregoing description, when the table plate is mounted on a router table, either one of the tool recesses 100 in feed screw units 18 can be accessed with a crank or the like to rotate the corresponding feed screw and thus the other feed screw through the idler sprocket wheel units and sprocket chain 114. Such rotation of the feed screws elevates or lowers the carriage and, therefore, elevates or lowers the router bit mounted in the router relative to top side 20 of table plate 12. When the router bit is in the desired position, the brake is operated to lock sprocket wheel 106 and thus the feed screws rotation. When it is desired to disassemble the router from the carriage, the router bit is removed from the router, the brake is released, the router plate is removed from the router table and turned upside down, and the mounting procedure described above is reversed.

While particular emphasis has been placed herein on the preferred embodiment illustrated and described, it will be appreciated that many changes can be made in the preferred embodiment and that other embodiments of the support mechanism can be devised without departing from the principles of the invention. In this respect, for example, the screw and guide post arrangement could be similar to that shown and described in my aforementioned U.S. Pat. No. 6,505,659. However, in order to accommodate the mounting of a wide variety of router makes and models, the latter mounting arrangement would undesirably increase the size of the table plate, whereby the arrangement disclosed and described herein is preferred. Further, while it is preferred that the drive arrangement include a steel roller chain and sprocket wheels, it will be appreciated that other toothed wheel and drive belt arrangements can be used to achieve the desired simultaneous rotation of the lift screw units. Still further, rotation of the feed screws can be achieved other than by rotating one of the feed screw assemblies and, for example, the sprocket chain could be driven by an idler sprocket separate from the feed screw units. These and other modifications of the preferred embodiment as well as other embodiments of the invention will be obvious and suggested from the foregoing description of the preferred embodiment, whereby it is to be distinctly understood that the descriptive matter herein is to be interpreted merely as illustrative of the invention and not as a limitation.

The invention claimed is:

1. A support mechanism for a router having a router axis, comprising:
   a table plate having top and bottom sides and an opening therethrough having an opening axis;
   a carriage beneath said table plate for supporting a router coaxial with said opening axis;
   guide post means slidably supporting said carriage for axial displacement toward and away from said table plate;
   adjusting screw means rotatable relative to said table plate and interengaging with said carriage for rotation of said screw means to displace said carriage relative to said table plate;

said carriage including support means interengaging with said guide post means and adjusting screw means, and a router mounting plate removably mounted on said support means;

wherein said support means includes a pair of diametrically opposed carriage blocks, said guide post means and screw means interengaging with said carriage blocks;

wherein said screw means includes an adjusting screw interengaged respectively with each of said carriage blocks;

drive means for simultaneously rotating the adjusting screws; wherein said drive means includes a sprocket wheel on each adjusting screw for rotation therewith, a pair of sprocket wheels on the bottom side of said table plate for rotation relative thereto, and endless belt means trained about the sprocket wheels on the adjusting screws and said pair of sprocket wheels; and a brake interengageable with one of said pair of sprocket wheels for selectively precluding rotation of said adjusting screws.

2. A mechanism according to claim 1 wherein said router mounting plate includes a plurality of sets of mounting holes therethrough, each set for attaching a structurally different router to said mounting plate.

3. A mechanism according to claim 2, wherein the bottom side of said table plate is recessed about said opening to receive said mounting plate when said carriage is displaced toward said table plate.

4. A mechanism according to claim 3, further including a brake for selectively precluding rotation of said screw means.

5. A mechanism according to claim 1 wherein the bottom side of said table plate is recessed about said opening to receive said mounting plate when said carriage is displaced toward said table plate.

6. A mechanism according to claim 1, wherein said means for rotating said adjusting screws includes one of the adjusting screws having an end accessible at said top side of said table plate for rotating the corresponding sprocket wheel.

7. A mechanism according to claim 6, wherein each of the adjusting screws has an end accessible at said top side of said table plate.

8. A mechanism according to claim 7, wherein said adjusting screws are on diametrically opposite sides of said opening and said pair of sprocket wheels are on diametrically opposite sides of said opening and circumferentially between the adjusting screws.

9. A mechanism according to claim 1 wherein said means for rotating said pair of adjusting screws includes each screw having an end accessible at the top side of the table plate for rotating the corresponding sprocket wheel.

10. A mechanism according to claim 9, wherein each of the adjusting screws has an end exposed at said top side of said table plate, and indicia on said end of each screw for indicating the axial position of said carriage relative to said table plate.

11. A mechanism according to claim 1, wherein said one of said pair of sprocket wheels has an end accessible at said top side of said table plate for operating said brake.

12. A mechanism according to claim 1, and a cam interengageable with the other of said pair of sprocket wheels for adjusting the tension on said endless belt means.

13. A mechanism according to claim 1 wherein said guide post means includes a pair of guide posts slidably interengaged with each of the carriage blocks.

14. A mechanism according to claim 13, wherein said adjusting screws have axes coplanar with the axis of the opening in said table plate and the guide posts of each pair of guide posts are on opposite sides of the plane through the adjusting screw and opening axes.

15. A mechanism according to claim 14, wherein said adjusting screws are spaced radially outwardly of the corresponding pair of guide rods.

16. A mechanism according to claim 1 wherein said means for rotating said adjusting screws includes one of the adjusting screws having a lower end disposed beneath said table plate and a nut mounted on the one of the adjusting screws adjacent the lower end for rotating the corresponding sprocket wheel.

17. A support mechanism for a router having a router axis, comprising a table plate having top and bottom sides and an opening therethrough having an opening axis, a carriage beneath said plate for supporting a router coaxial with said opening axis, said carriage including carriage blocks on opposite sides of said axis and a router mounting plate therebetween and removably attached thereto, guide posts each having a post axis parallel to said opening axis, said guide posts slidably interengaging with said carriage blocks to support said carriage for axial displacement toward and away from said table plate, and a pair of adjusting screws on diametrically opposite sides of said opening, each adjusting screw being rotatable relative to said table plate about a corresponding screw axis parallel to said opening axis, and said adjusting screws interengaging with said carriage blocks for rotation of the screws to displace said carriage relative to said plate;

wherein said router mounting plate includes a plurality of sets of mounting holes therethrough, each set for attaching a structurally different router to said mounting plate;

drive means for simultaneously rotating the adjusting screws;

wherein said drive means includes a sprocket wheel on each adjusting screw for rotation therewith, a pair of sprocket wheels on the bottom side of said table plate for rotation relative thereto, and endless belt means trained about the sprocket wheels on the adjusting screws and said pair of sprocket wheels; and a brake interengageable with one of said pair of sprocket wheels for selectively precluding rotation of said adjusting screw, said one of said pair of sprocket wheels having an end accessible at said top side of said table plate for operating said brake.

18. A mechanism according to claim 17 wherein one of the adjusting screws has an end accessible at said top side of said table plate for rotating the corresponding sprocket wheel.

19. A mechanism according to claim 18, wherein each of the adjusting screws has an end exposed at said top side of said table plate, and indicia on said end of each screw for indicating the axial position of said carriage relative to said table plate.

20. A mechanism according to claim 17 and a cam on the other of said pair of sprocket wheels for adjusting the tension on said belt means.

21. A mechanism according to claim 17 and means on one of said pair of sprocket wheels for adjusting the tension on said endless belt means.

22. A mechanism according to claim 17 wherein one of the adjusting screws has a lower end disposed beneath said table plate and a nut mounted on the one of the adjusting screws adjacent the lower end for rotating the corresponding sprocket wheel.

23. A mechanism according to claim 17 wherein said guide posts include a pair of guide posts slidably interengaged with each of the carriage blocks, said adjusting screws having axes coplanar with the axis of the opening in said table plate, and the guide posts of each pair of guide posts being on opposite sides of the plane through the adjusting screw and opening axes.

24. A mechanism according to claim 23, wherein said drive means includes a sprocket wheel on each adjusting screw for rotation therewith, a pair of sprocket wheels on the bottom side of said table plate for rotation relative thereto, and endless belt means trained about the sprocket wheels on the adjusting screws and said pair of sprocket wheels, and at least one of the adjusting screws having an end accessible at said top side of said table plate for rotating the corresponding sprocket wheel.

25. A mechanism according to claim 17 wherein at least one of the adjusting screws has a lower end disposed beneath said table plate and a nut mounted on the one of the adjusting screws adjacent the lower end for rotating the corresponding sprocket wheel.

26. An apparatus comprising
a table plate having a top and a bottom and defining a through opening extending from the top to the bottom;
a carriage which is disposed beneath the table plate and adapted to support a router below the opening; the through opening of the table plate adapted to receive therethrough a cutter bit of the router;
at least one adjusting screw which is rotatable to move the carriage toward and away from the table plate;
a belt for driving rotation of the at least one adjusting screw;
a first sprocket wheel which engages the belt;
a brake for selectively engaging the first sprocket wheel to selectively preclude rotation of the at least one adjusting screw.

27. The apparatus of claim 26 wherein the brake includes a brake pad which is mounted on the table plate by a braking screw which is rotatable to move the brake pad toward and away from the first wheel sprocket.

28. The apparatus of claim 27 wherein the brake pad threadedly engages the braking screw.

29. The apparatus of claim 28 wherein the brake includes a brake stem mounted on and extending downwardly from the table plate; wherein the first sprocket wheel is rotatably mounted on the brake stem; wherein the brake stem defines a bore in which the braking screw is disposed; and wherein the brake pad engages the brake stem to restrain rotation of the brake pad relative to the brake stem.

30. The apparatus of claim 29 wherein the brake stem adjacent a lower end thereof defines a recess which communicates with and is wider than the through bore; and wherein a portion of the brake pad is disposed in the recess.

31. The apparatus of claim 27 wherein the braking screw has an end accessible at the top of the table plate for rotating the braking screw.

32. The apparatus of claim 27 wherein the brake forces the first sprocket wheel against the table plate to preclude rotation of the at least one adjusting screw.

33. The apparatus of claim 26 wherein the brake forces the first sprocket wheel against the table plate to preclude rotation of the at least one adjusting screw.

34. The apparatus of claim 26 wherein a second sprocket wheel is mounted on the at least one adjusting screw and engages the belt whereby the belt drives rotation of the at least one adjusting screw via the second sprocket wheel.

35. An apparatus comprising
a table plate having a top and a bottom and defining a through opening extending from the top to the bottom;
a carriage which is disposed beneath the table plate and adapted to support a router below the opening; the through opening of the table plate adapted to receive therethrough a cutter bit of the router;
at least one adjusting screw which is rotatable to move the carriage toward and away from the table plate;
a belt for driving rotation of the at least one adjusting screw;
a first sprocket wheel which engages the belt; and
a cam which engages the first sprocket wheel for adjusting the tension on the belt.

36. The apparatus of claim 35 wherein the first sprocket wheel is rotatably mounted on the cam.

37. The apparatus of claim 36 wherein the cam is rotatable about a first axis and the first sprocket wheel is rotatable about a second axis which is parallel to and offset from the first axis.

38. The apparatus of claim 37 wherein the cam has a cylindrical outer surface about which the first sprocket wheel is rotatably mounted; wherein the cam defines an off center bore; wherein a mounting screw is disposed in the bore; and wherein the first axis passes through the mounting screw.

39. The apparatus of claim 36 wherein the cam defines a bore and a mounting screw extends through the bore to mount the cam on the table plate.

40. The apparatus of claim 39 wherein the mounting screw selectively clamps the cam to the table plate to prevent rotation of the cam.

41. The apparatus of claim 35 wherein the cam is rotatable about a first axis and the first sprocket wheel is rotatable about a second axis which is parallel to and offset from the first axis.

42. The apparatus of claim 35 wherein a second sprocket wheel is mounted on the at least one adjusting screw and engages the belt whereby the belt drives rotation of the at least one adjusting screw via the second sprocket wheel.

* * * * *